(12) United States Patent
Tang et al.

(10) Patent No.: US 11,632,432 B2
(45) Date of Patent: Apr. 18, 2023

(54) DYNAMIC OVERFLOW PROCESSING IN A MULTI-USER COMPUTING ENVIRONMENT

(71) Applicant: INTERNATIONAL BUSINESS MACHINES CORPORATION, Armonk, NY (US)

(72) Inventors: Dung Thi Tang, Richmond Hill (CA); David Kenneth McKnight, Newmarket (CA); Daniel Paroski, Innisfil (CA); Yichong Zhang, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 45 days.

(21) Appl. No.: 17/342,606

(22) Filed: Jun. 9, 2021

(65) Prior Publication Data
US 2022/0398098 A1 Dec. 15, 2022

(51) Int. Cl.
*H04L 67/148* (2022.01)

(52) U.S. Cl.
CPC ................. *H04L 67/148* (2013.01)

(58) Field of Classification Search
None
See application file for complete search history.

(56) References Cited

U.S. PATENT DOCUMENTS

| | | | |
|---|---|---|---|
| 9,838,375 B2 * | 12/2017 | Taine | H04L 63/0807 |
| 10,025,692 B2 | 7/2018 | Wood et al. | |
| 10,212,220 B2 | 2/2019 | Wu et al. | |
| 10,348,565 B2 | 7/2019 | Kannan et al. | |
| 10,992,744 B1 * | 4/2021 | Kutuzov | H04L 67/61 |
| 2010/0169477 A1 * | 7/2010 | Stienhans | G06F 9/5083 709/224 |

(Continued)

OTHER PUBLICATIONS

Author: Riccardo Lancellotti et al. Title: "Dynamic request management algorithms for Web-based services in cloud computing" Publisher: IEEE DOI 10.1109/COMPSAC.2011.59 (Year: 2011).*

(Continued)

*Primary Examiner* — John A Follansbee
*Assistant Examiner* — Kamal M Hossain
(74) *Attorney, Agent, or Firm* — Teddi Maranzano, Esq.; Kevin P. Radigan, Esq.; Heslin Rothenberg Farley & Mesiti P.C.

(57) ABSTRACT

Dynamic overflow processing is provided in a multi-user computing environment, which includes receiving, from a user, a request for a new user session at a port of a process of the multi-user computing environment, where the process supports multiple users via the port, and determining that accommodating the new user session will result in resource usage of the process exceeding a predetermined capacity threshold for the process. Based on determining that capacity threshold will be exceeded, the process redirects the request for the new user session to an overflow process started by the process, where the overflow process is an additional instance of the process running within the multi-user computing environment. The process receives a response from the overflow process to the request for the new user session, and forwards the received response to the request for the new user session to the user.

14 Claims, 14 Drawing Sheets

(56) References Cited

U.S. PATENT DOCUMENTS

2011/0161980 A1* 6/2011 English .................. H04L 47/70
718/105
2020/0287794 A1* 9/2020 Rastogi ............... G06F 9/45558

OTHER PUBLICATIONS

Mel et al., "The NIST Definition of Cloud Computing," National Institute of Standards and Technology, Information Technology Laboratory, Special Publication 800-145, Sep. 2011 (pp. 1-7).
Deloitte Development LLC, "SAP Application Server Autoscaling", Deloitte Toche Tohmatsu Limited, UK, downloaded from https://www2.deloitte.com/content/dam/Deloitte/us/Documents/process-and-operations/us-sap-application-server-auto-scaling.pdf) (Year: 2017) (pp. 1-2).
IBM Publication, "z/Architecture Principles of Operation," IBM® Publication No. SA22-7832-12, 13th Edition, Sep. 2019 (pp. 1-2000).

\* cited by examiner

RECEIVE, FROM A USER, A REQUEST FOR A NEW USER SESSION AT A PORT OF A PROCESS OF THE MULTI-USER COMPUTING ENVIRONMENT, THE PROCESS SUPPORTING MULTIPLE USERS THROUGH THE PORT ~700

DETERMINE, BY THE PROCESS, THAT ACCOMMODATING THE NEW USER SESSION WILL RESULT IN RESOURCE USAGE OF THE PROCESS EXCEEDING A PREDETERMINED CAPACITY THRESHOLD FOR THE PROCESS ~702

BASED ON THE DETERMINING, REDIRECTING BY THE PROCESS THE REQUEST FOR THE NEW USER SESSION TO AN OVERFLOW PROCESS STARTED BY THE PROCESS, THE OVERFLOW PROCESS BEING AN ADDITIONAL INSTANCE OF THE PROCESS RUNNING WITHIN THE MULTI-USER COMPUTING ENVIRONMENT ~704

RECEIVE, BY THE PROCESS, A RESPONSE FROM THE OVERFLOW PROCESS TO THE REQUEST FOR THE NEW USER SESSION ~706

FORWARD, BY THE PROCESS, THE RECEIVED RESPONSE TO THE REQUEST FOR THE NEW USER SESSION TO THE USER ~708

WHERE THE PROCESS IS AN APPLICATION SERVER, AND THE OVERFLOW PROCESS IS AN OVERFLOW APPLICATION SERVER, AND THE METHOD FURTHER INCLUDES STARTING, BY THE APPLICATION SERVER, THE OVERFLOW APPLICATION SERVER AS ANOTHER INSTANCE OF THE APPLICATION SERVER, THE STARTING BEING BASED ON RESOURCE USAGE AT THE APPLICATION SERVER, AND THE RESOURCE USAGE COMPRISING ONE OR MORE OF A NUMBER OF USERS USING THE APPLICATION SERVER, A NUMBER OF THREADS BEING USED BY THE APPLICATION SERVER, OR AN AMOUNT OF MEMORY BEING USED BY THE APPLICATION SERVER ~710

FIG. 7A

WHERE THE DETERMINING AND THE REDIRECTING OCCUR AT A REDIRECT FILTER OF THE PROCESS, ABSENT SETUP THE NEW USER SESSION AT THE PROCESS ~712

WHERE THE PROCESS INCLUDES AN OVERFLOW PORT MAP DATA STRUCTURE IDENTIFYING A CHAIN OF ONE OR MORE OVERFLOW PROCESSES ASSOCIATED WITH THE PROCESS, AND WHERE THE PROCESS UPDATES THE OVERFLOW PORT MAP DATA STRUCTURE BASED ON RECEIPT OF THE RESPONSE FROM THE OVERFLOW PROCESS TO THE REQUEST TO INDICATE THAT THE USER'S SESSION IS MAPPED TO THE OVERFLOW PROCESS, THE OVERFLOW PORT MAP DATA STRUCTURE FACILITATING REDIRECTING ONE OR MORE OTHER REQUESTS TO AN APPROPRIATE OVERFLOW PROCESS OF THE ONE OR MORE OVERFLOW PROCESSES IN THE CHAIN ~714

WHERE THE REDIRECTING, BY THE PROCESS, THE REQUEST FOR THE NEW USER SESSION TO THE APPROPRIATE OVERFLOW PROCESS, AND THE RECEIVING, BY THE PROCESS, THE RESPONSE FROM THE APPROPRIATE OVERFLOW PROCESS TO THE REQUEST FOR THE NEW USER SESSION OCCUR TRANSPARENT TO THE USER ~716

WHERE THE REQUEST IS A NEW REQUEST, AND THE METHOD FURTHER INCLUDES: ~718

RECEIVING, FROM ANOTHER USER, A PRIOR REQUEST FOR A USER SESSION AT THE PORT OF THE PROCESS OF THE MULTI-USER COMPUTING ENVIRONMENT, THE PRIOR REQUEST BEING PRIOR TO THE NEW REQUEST ~720

DETERMINING BY THE PROCESS, THAT ACCOMMODATING THE USER SESSION OF THE PRIOR REQUEST AT THE PROCESS WILL RESULT IN A PRE-OVERFLOW CONDITION RELATIVE TO THE PREDETERMINED CAPACITY THRESHOLD ~722

BASED ON DETERMINING EXISTENCE OF THE PRE-OVERFLOW CONDITION, PREPARING FOR AN OVERFLOW OF THE PROCESS BY STARTING THE OVERFLOW PROCESS, WHILE ACCOMMODATING THE USER SESSION OF THE PRIOR REQUEST AT THE PROCESS ~724

FIG. 7B

WHERE THE REQUEST IS A NEW REQUEST, AND THE METHOD FURTHER INCLUDES: ~726

RECEIVING, FROM ANOTHER USER, ANOTHER REQUEST FOR A USER SESSION AT THE PORT OF THE PROCESS OF THE MULTI-USER COMPUTING ENVIRONMENT ~728

DETERMINING, BY THE PROCESS, THAT ACCOMMODATING THE USER SESSION OF THE OTHER REQUEST WILL RESULT IN RESOURCE USAGE AT THE PROCESS REMAINING BELOW THE PREDETERMINED CAPACITY THRESHOLD ~730

BASED ON DETERMINING THAT ACCOMMODATING THE USER SESSION OF THE OTHER REQUEST WILL RESULT IN RESOURCE USAGE AT THE PROCESS REMAINING BELOW THE PREDETERMINED CAPACITY THRESHOLD, ACCOMMODATING THE OTHER REQUEST FOR THE USER SESSION AT THE PROCESS ~732

FURTHER INCLUDING DETERMINING, BY THE OVERFLOW PROCESS, THAT ACCOMMODATING THE NEW USER SESSION WILL RESULT IN RESOURCE USAGE AT THE OVERFLOW PROCESS EXCEEDING A PREDETERMINED CAPACITY THRESHOLD FOR THE OVERFLOW PROCESS, AND BASED THEREON, REDIRECTING, BY THE OVERFLOW PROCESS, THE REQUEST FOR THE NEW USER SESSION TO ANOTHER OVERFLOW PROCESS STARTED BY THE OVERFLOW PROCESS, THE OTHER OVERFLOW PROCESS BEING ANOTHER INSTANCE OF THE PROCESS RUNNING WITHIN THE MULTI-USER COMPUTING ENVIRONMENT ~734

FURTHER INCLUDING DETECTING, PRIOR TO THE REDIRECTING, THAT THE OVERFLOW PROCESS IS DOWN, AND BASED THEREON, RESTARTING, BY THE PROCESS, THE OVERFLOW PROCESS AS A NEW INSTANCE OF THE PROCESS RUNNING WITHIN THE MULTI-USER COMPUTING ENVIRONMENT ~736

FIG. 7C

DYNAMIC OVERFLOW PROCESSING IN A MULTI-USER COMPUTING ENVIRONMENT

BACKGROUND

One or more aspects relate, in general, to facilitating processing within a computing environment, and in particular, to improving processing within a computing environment.

There are various types of computing environments, ranging from simple environments to more complex environments. In one embodiment, a computing environment can be a multi-user computing environment or system where, for instance, a single instance of software and its supporting infrastructure serve multiple users. In a multi-user system, each user shares a process or application, for instance, an application server, and also shares system resources, but each user's data and processing is isolated and remains invisible to the other users. A mainframe computing environment is one example of such a multi-user system. For instance, in a mainframe environment, multiple users can work on or access a given operating system at a time. In some cases, there may even be hundreds or even thousands of users, each accessing the same operating system.

To access resources on a multi-user operating system, users will often deploy processes such as application servers. Application servers allow access to resources in a secure manner. There are a variety of application servers available which can handle requests from multiple users at the same time. For example, to provide access to z/OS® system resources, there are variety of application servers available, including z/OS management facility (MF), z/OS Connect, file transfer protocol (FTP), remote system explorer daemon (RSED), remote system explorer application interface (RSE API), and various Zowe® services. (Note that z/OS is a registered trademark of International Business Machines Corporation in one or more jurisdictions, and Zowe is a registered trademark of the Linux Foundation in one or more jurisdictions.)

SUMMARY

Certain shortcomings of the prior art are overcome and additional advantages are provided through the provision, in one or more aspects, of a computer program product for facilitating processing within a multi-user computing environment. The computer program product includes at least one computer-readable storage medium having program instructions embodied therewith. The program instructions are readable by a processing circuit to cause the processing circuit to perform a method, which includes receiving, from a user, a request for a user session at a port of a process of the multi-user computing environment, the process supporting multiple users through the port, and determining, by the process, that accommodating the new user session will result in resource usage of the process exceeding a predetermined capacity threshold for the process. Based on determining that the new user session will result in resource usage at the process exceeding the predetermined capacity threshold, redirecting, by the process, the request for the new user session to an overflow process started by the process, where the overflow process is an additional instance of the process running within the multi-user computing environment. Further, the method includes receiving, by the process, a response from the overflow process to the request for the new user session, and forwarding, by the process, the received response to the request for the new user session to the user.

Computer systems and computer-implemented methods relating to one or more aspects are also described and claimed herein. Further, services relating to one or more aspects are also described and may be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 7A-7C depict one example of facilitating processing within a multi-user computing environment, in accordance with one or more aspects of the present invention;

DETAILED DESCRIPTION

Figure 1A:
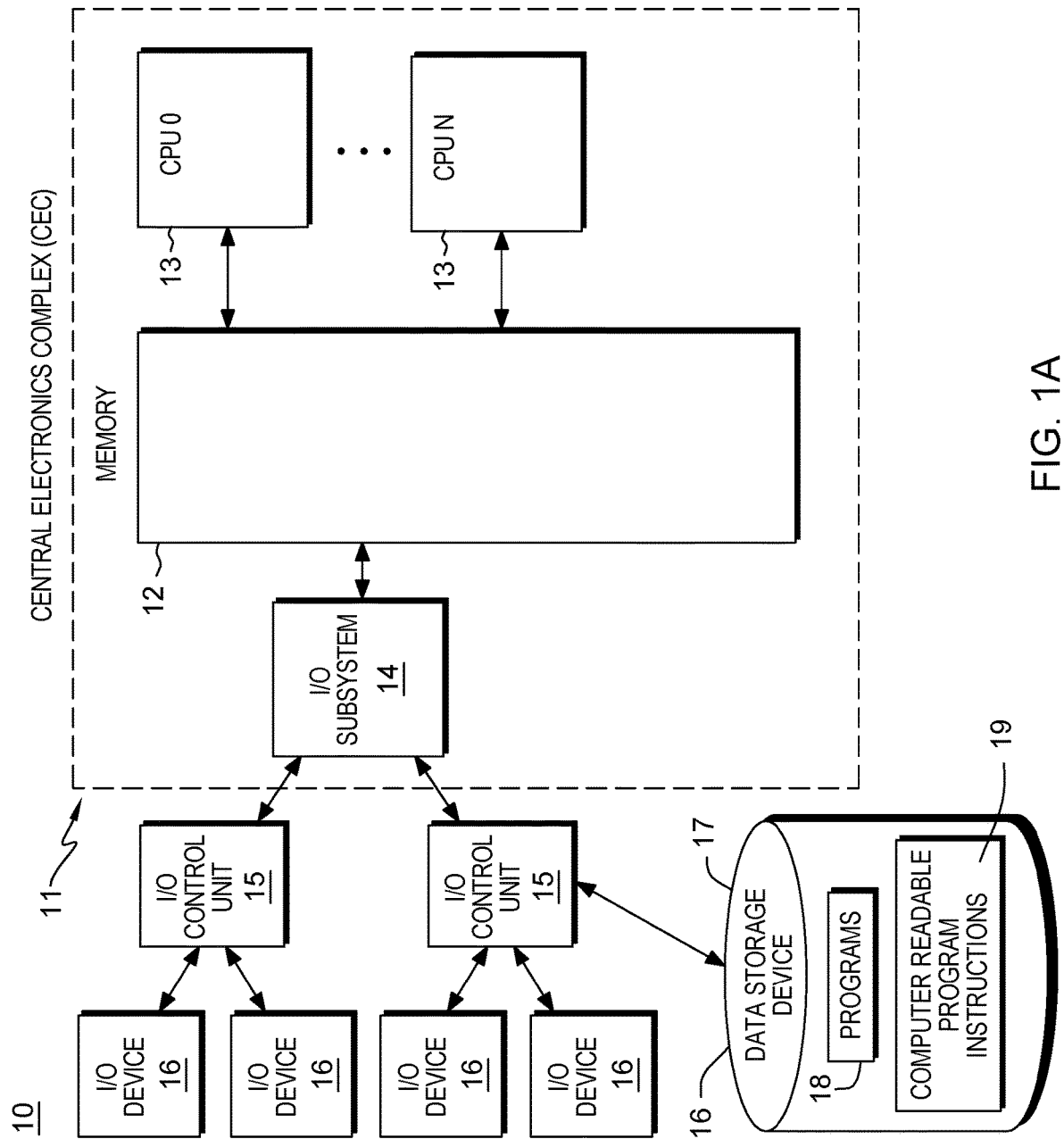
FIG. 1A depicts one example of a computing environment to incorporate and use one or more aspects of the present invention.

In accordance with an aspect of the present invention, multi-user computing environment processing is facilitated and improved. In one or more embodiments, a multi-user process, such as an application server, is provided with a facility that supports automatic scaling optimized for resource usage, with minimal configuration and administration overhead.

As noted, there are various types of computing environments, ranging from simple environments to more complex environments, and ranging from single-user to multi-user computing environments. In a multi-user computing environment, multiple users (i.e., multiple user devices or systems), can access a given operating system image of the computing environment at the same time. In certain cases, there can be hundreds or even thousands of users accessing the same operating system. To provide access to system resources, there are a variety of application servers available, each of which is configured to handle requests from multiple users at the same time.

By way of example, a multi-user computing environment can include one or more systems, such as one or more logical partitions (LPARs), with each logical partition being a different instance of an operating system running within the computing environment. In one embodiment, the multi-user computing environment can include, or run on, one or more mainframe computers. To access resources within the computing environment, processes, such as application servers, are deployed on one or more systems. In one embodiment only, one or more of the application servers can include thread pool servers to facilitate user access to resources of the computing environment.

Depending on the nature of a given application server, there may be underlying states to maintain for each user (or each user system). For example, a remote system explorer daemon (RSED) establishes a dedicated server for each user within its thread pools. To perform well and to allow for secure access, a number of dedicated and secure threads are allocated for each user session. On certain operating systems, such as the z/OS operating system, each thread accounts for a fixed amount of memory (e.g., heap memory), and as such, in a given process (of the application server) there are a finite number of allowable threads. Given a required number threads for a user, this implies that there is a ceiling to the amount of resources available at the application server. That ceiling can limit the number of threads allowed, and therefore, the number of user sessions that can be maintained by a given application server. If the number of users for a given application server is relatively low, for instance, less than 50, then it should be possible to maintain all user threads within a single process. However, at a certain point, the number of users multiplied by the number of threads per user required can exceed resource capacity of the application server. In order to scale well, an application server needs to be able to overcome these challenges posed by capacity restrictions.

By way of example, FIG. 1A depicts one embodiment of a computing environment to incorporate and use one or more aspects of the present invention. In one embodiment, the computing environment is based on the z/Architecture® instruction set architecture, offered by International Business Machines Corporation, Armonk, N.Y. One embodiment of the z/Architecture instruction set architecture is described in a publication entitled, "z/Architecture Principles of Operation," IBM® Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. (z/Architecture and IBM are trademarks or registered trademarks of International Business Machines Corporation in one or more jurisdictions.)

In one example, a computing environment 10 includes a central electronics complex (CEC) 11. Central electronics complex 11 includes a plurality of components, such as, for instance, a memory 12 (a.k.a., system memory, main memory, main storage, central storage, storage) coupled to one or more processors (a.k.a., central processing units (CPUs)) 13 and to an input/output (I/O) subsystem 14.

I/O subsystem 14 can be a part of the central electronics complex or separate therefrom. It directs the flow of information between main storage 12 and input/output control units 15 and input/output (I/O) devices 16 coupled to the central electronics complex.

Many types of I/O devices may be used. One particular type is a data storage device 17. Data storage device 17 can store one or more programs 18, one or more computer readable program instructions 19, and/or data, etc. The computer readable program instructions can be configured to carry out functions of embodiments of aspects of the invention.

Central electronics complex 11 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 11. Examples include, but are not limited to: microcode, device drivers, redundant processing units, external disk drive arrays, RAID systems, tape drives, and data archival storage systems, etc.

Further, central electronics complex 11 can be operational with numerous other general-purpose or special-purpose computing system environments or configurations. Examples of well-known computing systems, environments, and/or configurations that are suitable for use with central electronics complex 11 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1C:
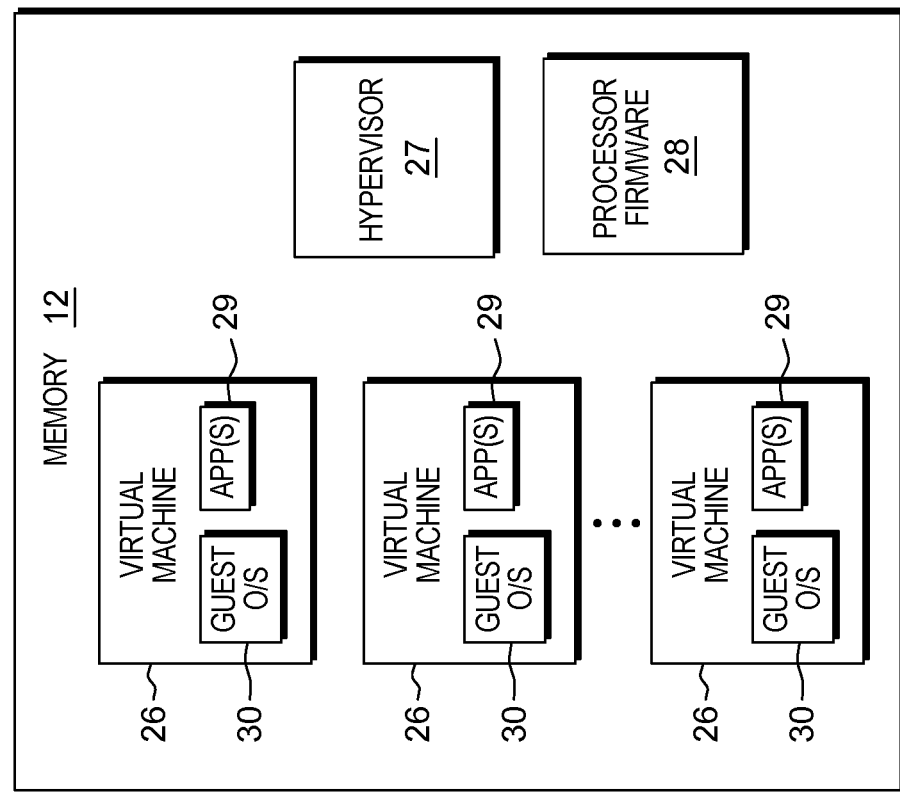
FIG. 1C depicts another example of further details of a memory for the computing environment of FIG. 1A, in accordance with one or more aspects of the present invention.
Figure 1B:
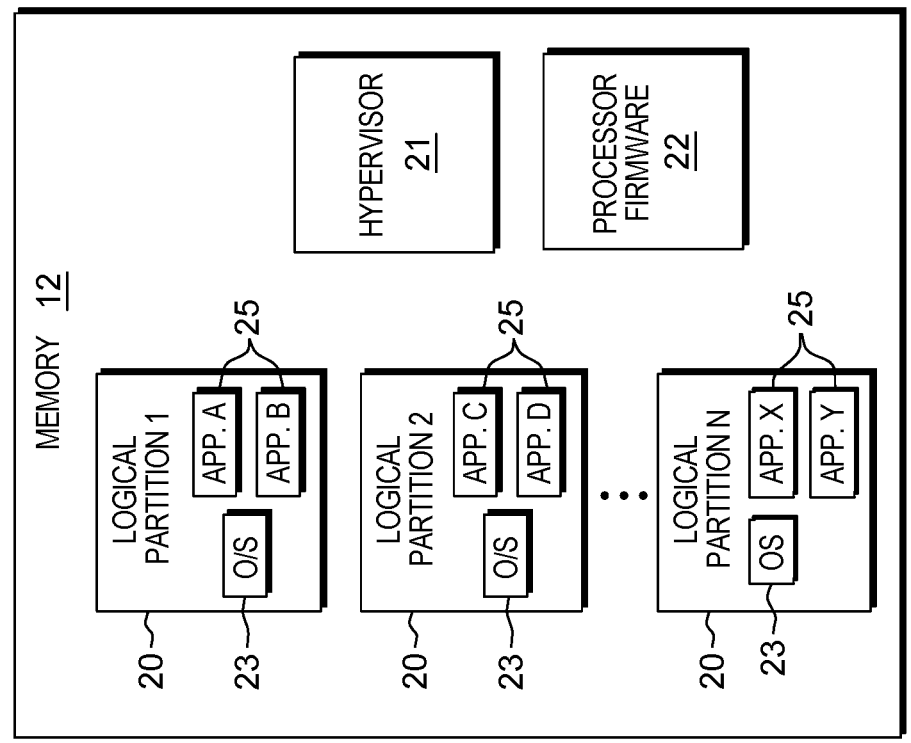
FIG. 1B depicts one example of further details of a memory for the computing environment of FIG. 1A, in accordance with one or more aspects of the present invention.

Central electronics complex 11 provides in one or more embodiments logical partitioning and/or virtualization support. In one embodiment, as shown in FIG. 1B, memory 12 includes, for example, one or more logical partitions 20, a hypervisor 21 that manages the logical partitions, and processor firmware 22. One example of hypervisor 21 is the Processor Resource/System Manager (PR/SM™), offered by International Business Machines Corporation, Armonk, N.Y. As used herein, firmware includes, e.g., the microcode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware. (PR/SM is a trademark or registered trademark of International Business Machines Corporation in one or more jurisdictions.)

Each logical partition 20 is capable of functioning as a separate system. That is, each logical partition can be independently reset, run a guest operating system 23 such as the z/OS operating system, offered by International Business Machines Corporation, or other control code, and operate with different application programs 25. An operating system or application program running in a logical partition appears to have access to a full and complete system, but in reality, only a portion of it is available. Although the z/OS operating system is offered as an example, other operating systems offered by International Business Machines Corporation and/or other companies may be used in accordance with one or more aspects of the present invention.

Memory 12 is coupled to CPUs 13 (FIG. 1A), which are physical processor resources that can be allocated to the logical partitions. For instance, a logical partition 20 includes one or more logical processors, each of which represents all or a share of a physical processor resource 13 that can be dynamically allocated to the logical partition.

In yet a further embodiment, the central electronics complex provides virtual machine support (either with or without logical partitioning support). As shown in FIG. 1C, memory 12 of central electronics complex 11 includes, for example, one or more virtual machines 26, a virtual machine manager, such as a hypervisor 27, that manages the virtual machines, and processor firmware 28. One example of hypervisor 27 is the z/VM® hypervisor, offered by International Business Machines Corporation, Armonk, N.Y. The hypervisor is sometimes referred to as a host. (z/VM is a trademark or registered trademark of International Business Machines Corporation in one or more jurisdictions.)

The virtual machine support of the central electronics complex provides the ability to operate large numbers of virtual machines 26, each capable of operating with different application programs 29 and running a guest operating system 30, such as the Linux® operating system. Each virtual machine 26 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

As noted, in a multi-user computing environment, multiple users can access the same operating system at the same time. To provide access to resources (such as z/OS resources) within a multi-user computing environment, there are a variety of application servers available (such as, the z/OS MF, z/OS Connect, FTP, RSED, RSE API, and various Zowe services), each of which needs to be able to handle requests from multiple users at the same time. In view of the resource constraints, and given the number of threads per user session required and process thread limits, there are only a few approaches to addressing the capacity issues. For instance, the least-recently-used user session threads could be removed. Sessions that have been idle longer than others can be closed out to make way for threads that serve more current user sessions. The difficulty with this approach is that it can only effectively work if some users are idle. If all users are active, then swapping threads out and in will involve significant processing churn, degrading performance and resulting in instability.

In another approach, a scaling solution can be implemented. One way to distribute an application across multiple processes is to run instances of the application under a load balancer (e.g., WLM) using a shared port. This spreads out the load and reduces points of failure. The approach requires a stateless server architecture, so that any given node can address a request consistently with any other. The approach can be useful when scaling challenges are centered on handling high volumes of requests. However, when the challenges are center on the capacity of the user session threads, a load balancer cannot significantly address the issue. The same user can make requests to multiple server instances, requiring user session threads on each instance used. If the capacity of a given server is, for instance, 50 concurrent users, and there are 51 users, then after a certain number of a requests, each server instance will eventually breach capacity. So load balancing alone cannot solve the problem when capacity is limited by user session threads.

Another approach to distributing application threads across multiple processes is illustrated by the remote system explorer daemon (RSED). RSED involves two types of sockets, namely, a single daemon socket for login and establishing a server connection, and a server socket, per user. RSED provides processes, called thread pool processes, that are spawned in order to distribute user sessions. When a user attempts login via the RSED daemon, capacity metrics are determined for a given thread pool at runtime to determine whether the memory and threads of a new user session can fit within a thread pool. If the user would be within capacity, then server threads are established for that user on a given thread pool. On the other hand, if the user session would take a thread pool beyond capacity, then the server and the user threads are established and assigned to another thread pool. New thread pool processes are commissioned or decommissioned according to user load. While the RSED approach can solve the problem of scale, a further approach for a representational state transfer architecture would be advantageous.

The approach described herein solves the problems noted above and drawbacks of other solutions using a RESTful architecture. A RESTful architecture is a software architecture designed to take advantage, in one or more implementations, of existing protocols. While REST can be used over nearly any protocol, it often takes advantage of http when used for web application interfaces (APIs). In one embodiment, representational state transfer (REST) is a web-standards-based architecture, and every component is a resource and a resource is accessed by a common interface.

In one implementation, a process (e.g., application server) pursuant to one or more aspects of the present invention uses RSE API, and runs within the computing environment as a web application server under a single port. There is no separate daemon or separate server ports per user, rather just a single point of entry for a given RSE API server instance. As such, only one port needs to be exposed through a firewall. Since the given RSE API instance will have a limited thread capacity, as with any application, to scale it needs to be able to distribute user session threads to separate processes. In accordance with one or more aspects disclosed herein, the notion of an overflow process or overflow server is introduced.

In one embodiment, a spawning, or primary, server handles user requests, and when a user makes a request to establish a session on the server or a command request with an existing user session, a capacity check is made at the server. Resource capacity in this context can mean, for instance, an available number of threads, available memory (e.g., heap memory), and/or number of available address spaces, etc. If a new user session or the new request of an existing session is within capacity of the primary server, then the primary server continues to handle the request, assigning the requisite user threads for the new user session. However, if the server is near or beyond capacity, then the user request is forwarded to a secondary (or overflow) server. When no overflow sever is available, and the primary server is configured to have one, a new instance of the server is spawned by the primary server to be used as overflow server for the primary server. Like the primary server, each overflow server can be configured to also have its own overflow server. In other words, RSE API can be used to produce a dynamic chain of overflow servers to distribute, for instance, the user session thread load across multiple servers. For any request, a server determines whether or not it should handle the request by itself, or forward the request down the chain. Since RSE API is RESTful, the scaling solution can also gain added resilience in combination with a load balancer. For that, multiple primary servers can run on the same shared port of the load balancer, with each primary server having its own overflow chain. In that way, the system can handle both a high number of concurrent users, while being resilient to points of failure, because of the presence of the load balancer.

Note in this regard that load balancers, such as WLM, exist for distributing requests across multiple server instances (e.g., multiple primary server instances). This can help reduce points of failure and distribute load in terms of requests. However, load balancers are not designed to determine resource thresholds on individually running server instances, and therefore cannot solve the problem addressed herein regarding the distribution of server resources, such as memory and threads, often associated with user sessions. In distributed and cloud environments, elasticity is achieved under environments that permit allocation of hardware resources. In other words, new systems can be provisioned to allow scaling to expand across multiple computers. In on-premise mainframe environments, these hardware resources are not available, so the solution described herein works particularly well under a more constrained environment.

Embodiments of the present invention include a computer program product, computer system and a computer-implemented method, where program code executing on one or more processors facilitates processing within a multi-user computing environment, and more particularly, facilitates request processing and scaling within the computing environment. As understood by one skilled in the art, program code, as referred to in this application, can include both software and hardware. For example, program code in one or more aspects of the present invention can include fixed function hardware, while other aspects can utilize a software-based implementation of the functionality described. Certain embodiments can combine both types of program code. One example of program code, also referred to as one or more programs, is depicted as applications 25 or 29 in memory 12 of FIGS. 1B & 1C, as well as programs 18 and computer-readable program instructions 19 in data storage device 17 in the example of FIG. 1A.

In one or more embodiments, the present invention includes program code which facilitates processing within a multi-user computing environment by receiving, from a user, a request for a new user session at a port of a process of the multi-user computing environment, the process supporting multiple users through the port, and determining, by the process, that accommodating the new user session will result in resource usage of the process exceeding a predetermined capacity threshold for the process. Based on the determining, the process redirects the request for the new user session to an overflow process started by the process, where the overflow process is an additional instance of the process running within the multi-user computing environment. Embodiments of the present invention also include program code which receives, by the process, a response from the overflow process to the request for the new user session, and forwards the received response to the request for the new user session to the user.

In one or more implementations, the process is an application server, and the overflow process is an overflow application server, and the method further includes starting, by the application server, the overflow application server as another instance of the application server, with the starting being based on resource usage of the application server, where resource usage includes one or more of a number of users using the application server, a number of threads being used by the application server, or an amount of memory being used by the application server.

In one embodiment, the program code determining and redirecting occur at a redirect filter of the process, absent setup of the new user session at the process. Further, in one embodiment, the process includes an overflow port map data structure identifying a chain of one or more overflow processes associated with the process, and the program code updates the overflow port map data structure based on receipt of the response from the overflow process to the request to indicate that the user session is mapped to the overflow process, the overflow port map data structure facilitating redirecting one or more other requests to an appropriate overflow process of the one or more overflow processes in the chain. Advantageously, the overflow port map is used in optimizing the request redirection to forward the request directly from the primary to the final target overflow. It reduces the traffic of the request and response relay through the chain.

In certain embodiments, the redirecting, by the process, the request for the new user session to the overflow process started by the process, and the receiving, by the process, the response from the overflow process to the request for the new user session occur transparent to the user.

In certain embodiments, the request is a new request, and the program code further receives, from another user, a prior request for a user session at the port of the process of the multi-user computing environment, the prior request being prior to the new request, and determines that accommodating the user session of the prior request at the process will result in a pre-overflow condition relative to the predetermined capacity threshold. Based on determining existence of the pre-overflow condition, the program code prepares for an overflow of the process by starting the overflow process, while accommodating the user session of the prior request at the process.

In certain implementations, the request is a new request, and the program code further receives, from another user, another request for a user session at the port of the process of the multi-user computing environment, and determines, by the process, that accommodating the user session of the other request will result in resource usage at the process remaining below the predetermined capacity threshold. Based on determining that accommodating the user session of the other request will result in resource usage at the process remaining below the predetermined capacity threshold, the program code accommodates the other request for the user session at the process.

In one or more implementations of the present invention, the program code facilitates determining, by the overflow process, that accommodating the new user session will result in resource usage at the overflow process exceeding a predetermined capacity threshold for the overflow process, and based thereon, redirecting, by the overflow process, the request for the new user session to another overflow process started by the overflow process, where the other overflow process is another instance of the process running within the multi-user computing environment. Additionally, in one or more embodiments, program code is provided that, based on an overflow port mapping chain, optimizes the request redirecting, by redirecting the process, the request for the new user request to an overflow in the chain. The overflow process being an additional instance of the same underlying application server as the process (or primary server).

In certain embodiments, the program code further facilitates, detecting, prior to the redirecting, that the overflow process is down, and based thereon, restarting, by the process, the overflow process as a new instance of the process running within the multi-user computing environment.

Embodiments of the present invention are inextricably tied to computing and provide significantly more than existing approaches to processing within a multi-user computing environment, such as a mainframe environment. For instance, embodiments of the present invention provide program code executing on one or more processing circuits to exploit the interconnectivity of various systems and processes, as well as to utilize various computing-centric data analysis and handling techniques in order to facilitate providing request handling and process scaling in a multi-user computing environment. A multi-user process, such as an application server, is provided with a facility that supports automatic scaling optimized for resource usage, with minimal configuration and administration overhead. Both the interconnectivity of systems and processes utilized, and the computer-exclusive data processing techniques utilized by the program code, enable various aspects of the present invention. Further, embodiments of the present invention provide significantly more than existing approaches to scaling processes within a multi-user computing environment.

In embodiments of the present invention, the program code provides significantly more functionality, including but not limited to: 1) program code that receives, from a user, a request for a new user session at a port of a process of a multi-user computing environment, the process supporting multiple users through the port; 2) program code that determines, by the process, that accommodating the new user session will result in resource usage of the process exceeding a predetermined capacity threshold for the process; 3) program code that, based on the determining, redirects, by the process, the request for the new user session to an overflow process started by the process, the overflow process being an additional instance of the process running within the multi-user computing environment; 4) program code that receives, by the process, a response from the overflow process to the request for the new user session; and 5) program code that facilitates forwarding, by the process, the received response to the request for the new user session to the user.

Figure 2A:
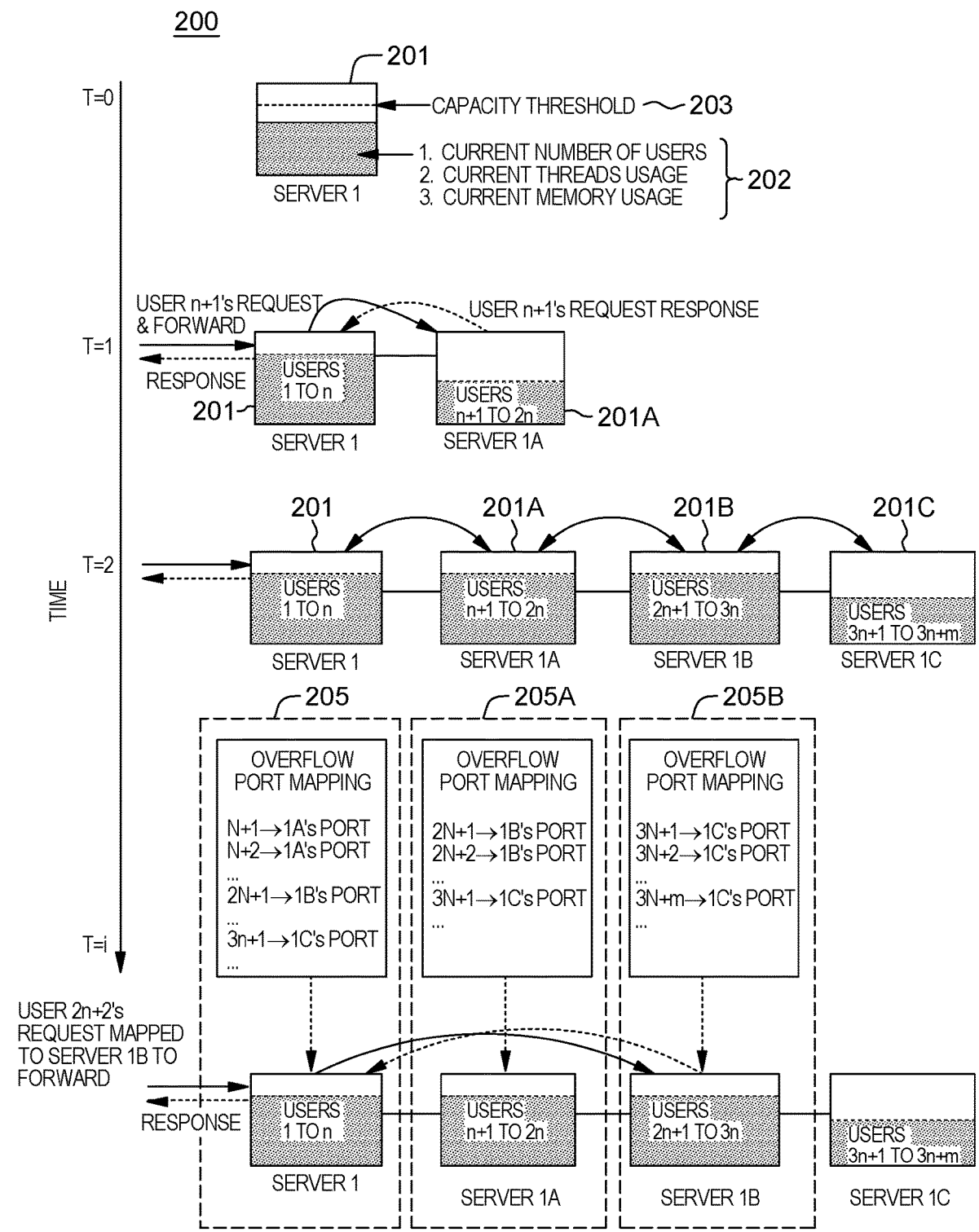
FIG. 2A depicts one embodiment of a multi-user computing environment with process (e.g., application server) scaling, in accordance with one or more aspects of the present invention.

By way of example, FIG. 2A illustrates an implementation of a multi-user computing environment 200 with scalable processing, as described herein. In one or more implementations, computing environment 200 can be implemented using, for instance, one or more computing environments such as described above in connection with FIGS. 1A-1C. As illustrated, computing environment 200 includes a process or server 201, such as an application server (server 1), defined by the system configuration. For instance, server 1 can be a process or server on a z/OS system. The resources 202 of the process running the service are defined by system configuration and the task parameters. In FIG. 2A, available resources 202 include (by way of example) a number of users able to be accommodated, a number of threads available for accommodating the users, and/or currently available memory. In one or more embodiments, resource usage is monitored by program code associated with server 1 to determine whether one or more of the current number of users, number of threads in use, or memory use, are at or close to a respective predetermined capacity threshold 203, such as 70-80% capacity, as an example only. When server 1 experiences a heavy load, and its resource usage increases to an allowed limit, that is, to a respective capacity threshold, the server can run out of memory or surpass other process limits, potentially resulting in the application crashing. With a shared resource pool, the excess load could also lead to a system-level crash.

In accordance with one or more aspects disclosed herein, an elastic process scaling facility is provided in association with server 201 to prevent, for instance, potential memory overflow on the server. Under conditions where a memory overflow is possible, one or more incoming requests can be routed to another server, referred to herein as an overflow server 201A (or direct overflow server) of server 201, which in this example is a primary server or process. Overflow server 201A in turn can apply the same scaling facility, when configured to do so. In one embodiment, overflow server 201A can be another instance of server 201, and when implemented on both servers, the scaling facility can be used to form a chain of overflow servers, each having a primary server and one or more overflow servers. A primary server can communicate directly with the user, it can spawn an overflow server, and does not automatically shut down. An overflow server is a server that is spawned by another server, and one that does not communicate directly with the user, can self-terminate, and can itself spawn its own overflow instance. For instance, in FIG. 2A, at time T2, multi-user computing system 200 runs a chain of servers 201, 201A, 201B, 201C, where server 1C 201C is an overflow server for server 1B 201B, which is an overflow server for server 1A 201A, which is an overflow server for server 1 201. Note that each server in the chain does not need to know about any other server in the chain, that is, besides its own overflow server. However, in optimized request redirection, the ports of overflow servers in the chain are recorded and used by the primary server. A server can be an overflow server of any server in the service, as long as the chain does not form a circle, to avoid looping in handling the request. An overflow server can be initiated or started in advance of when it is needed, or dynamically on the fly, by its primary server when the primary server detects a near-overflow condition.

When an overflow server experiences a significant idle time and does not have its own active overflow, it can also be configured to terminate itself to return its resources to the system when not in use. For a server that does not have a designated overflow server, then when an overflow condition is detected, it could also deny the request to avoid a server crash, or worse, a system crash. Again, categories of resources for capacity determination can include, for instance, the number of users, number of threads and/or memory heap usage. The number of users can be a significant parameter in many applications due to its association with the number of resources, especially with respect to persistent threads. A number of persistent threads are required for setting up a dedicated user session, in one or more embodiments.

As illustrated at time Ti in FIG. 2A, each server, 201, 201A, 201B, etc., can include an overflow port map table or data structure in a cache 205, 205A, 205B, respectively, which identifies which users (n+1, n+2, 2n+1, 2n+2, 3n+1, 3n+2, etc.) are mapped to which port server in the chain. This can be used to facilitate identifying, for instance, by server 201, that a particular user request is to be forwarded to one of the overflow servers in the respective chain. For instance, at time Ti, user 2n+2's request is shown to be mapped to server 201B, and as such, server 201 can forward the request directly to server 201B's port. Note that in this embodiment, it is assumed that each server has a single port for receiving requests and sending responses.

Advantageously, the overflow scaling disclosed herein is simple to deploy with, in one embodiment, the only information a process or server needs to know being its own overflow server. In contrast, typical load balancer mechanisms are implemented using a dedicated central server, which is the only place from which to distribute requests. In addition, the overflow scaling disclosed herein is elastic, with an overflow server being prepared only as needed, and with the overflow server self-terminating if not needed. An implementation of the overflow scaling disclosed herein is self-contained, meaning that it does not require extra configuration or dependencies as in other approaches, since each server is effectively its own load balancer. Further, the overflow scaling disclosed herein can be turned ON or OFF when starting a particular server. In addition, the algorithm for overflow condition determination in a particular process is resource-based, which is designed to optimize the resource usage of the entire service. Meanwhile, in other approaches (such as WLM), the request distribution mechanism is based on round-robin, ratio or the site command of the requests. Such balancing mechanisms do not account for resource usage status of a server handling the request.

Figure 2B:
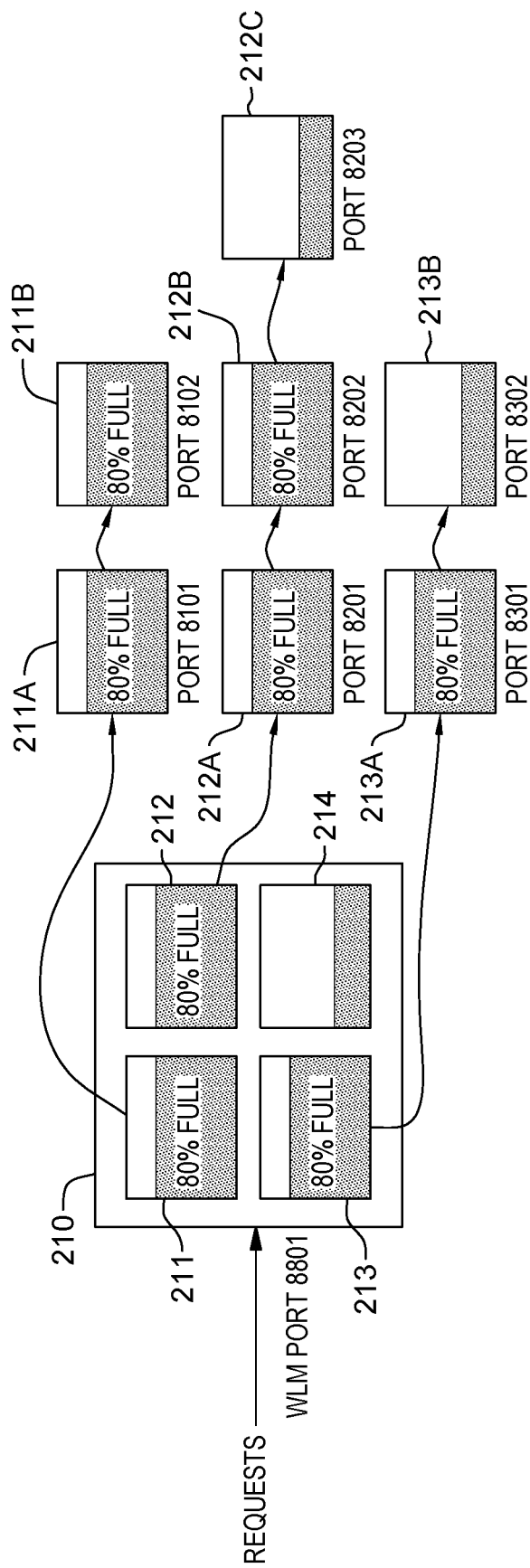
FIG. 2B depicts another embodiment of a multi-user computing environment, with process (e.g., application server) scaling, in accordance with one or more aspects of the present invention.

Advantageously, the overflow scaling facility disclosed herein can be used in combination with a load balancing mechanism. An example of this is depicted in FIG. 2B, where a multi-user computing environment 200' is illustrated. As with computing environment 200 of FIG. 2A, computing environment 200' of FIG. 2B can be part of, or implemented using, one or more computing environments, such as described above in connection with FIGS. 1A-1C. In the example of FIG. 2B, a load balancing mechanism 210 is illustrated, where requests are received and distributed to one of multiple predetermined servers 211, 212, 213 or 214. In this implementation, one or more servers 211-214 are each essentially a primary server as used herein, each of which can initiate a chain of overflow servers, such as overflow servers 211A and 211B for primary server 211, servers 212A-212C for primary server 212, and overflow servers 213A-213B for primary server 213, in one example.

Figure 3:
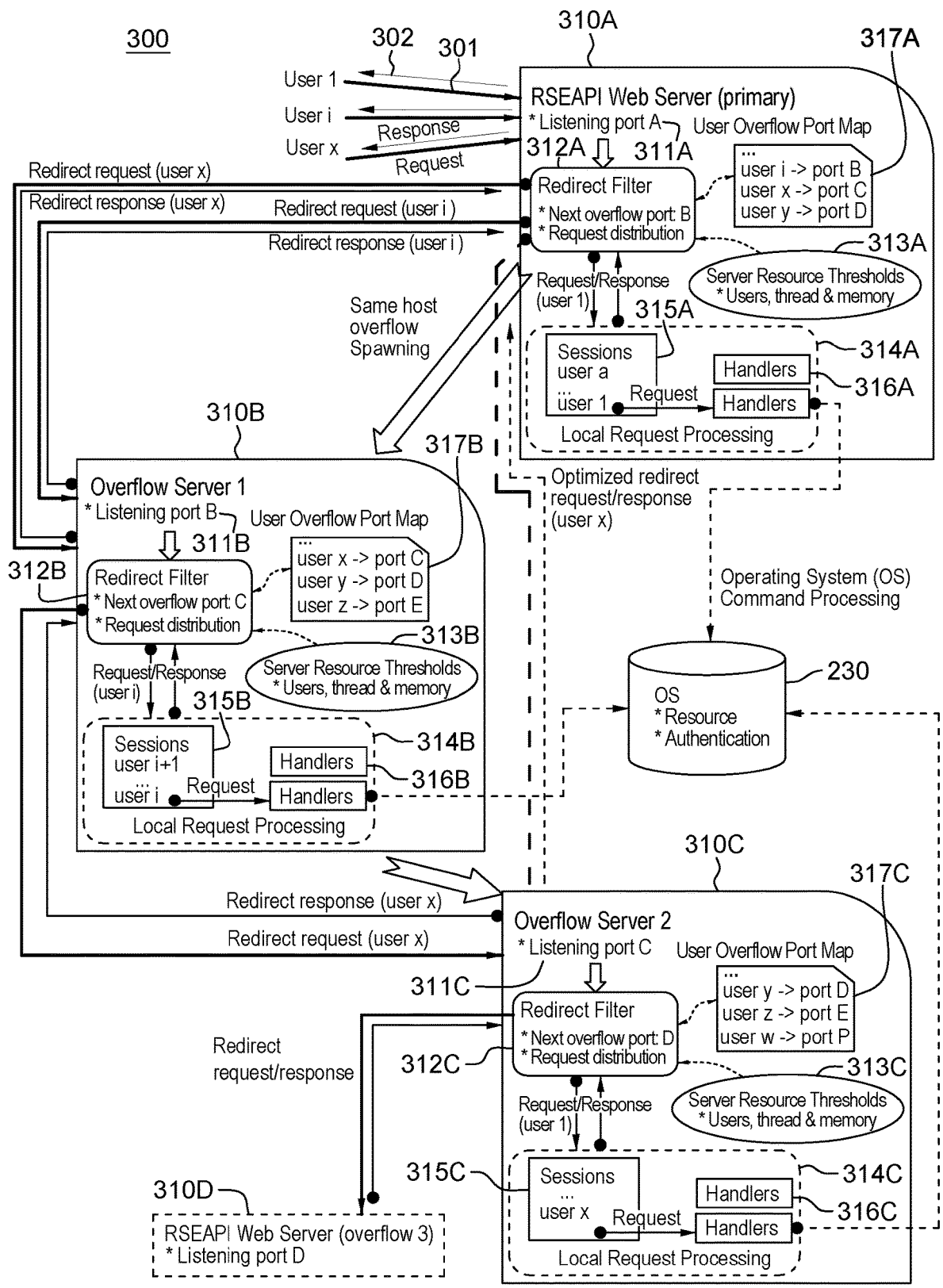
FIG. 3 is a more detailed example of a multi-user computing environment with application server scaling, in accordance with one or more aspects of the present invention.

FIG. 3 depicts one embodiment of a multi-user computing environment 300, such as a multi-user, multi-threaded computing environment, with request handling and overflow scaling processing as disclosed herein. In one or more embodiments, computing environment 300 of FIG. 3 can be part of, or implemented using, one or more computing environments, such as described herein.

By way of example only, computing environment 300 includes a process or server 310A, which is in one embodiment, an RSE API web server. Server 310A is one example of a primary server, which has an established overflow server 310B, which itself has an established overflow server 310C, which also has an established overflow server 310D, as described herein. In one embodiment, the overflow servers 310B-310D are instances of the same underlying application server as the primary server running within the same host system, such as the same operating system image, in one embodiment. Advantageously, server 310A, as well as overflow servers 310B-310D each have a single port for receiving user requests 301 and sending user responses 302. As illustrated, request handling and overflow processing code is implemented in a redirect filter 312A, which is coupled to receive a request on listening port A 311A for handling, as well as to send a response to the request. For a REST service, the overflow processing and scaling disclosed herein can be implemented at a servlet filter before an authentication filter for a web server application. In this manner, the user's request can be forwarded when appropriate to an overflow server, without consuming any resources for setting up a session at the primary server. Where there is sufficient resource capacity for the request to be handled on the primary server, the request (for instance, from user 1) undergoes local request processing 316A at the server, which includes opening a user session 315A, or using an existing session, to process the request via handlers 316 for, for instance, accessing one or more operating system resources 320. Where the request is a request for a new user session received at listening port 311A, redirect filter 312A can reference available capacity thresholds 313A for one or more server constraints, such as number of users that can be accommodated, number of process threads available, and amount of memory available for server processing. Assuming that the primary server 310A is below its predetermined capacity threshold(s), then the request is accommodated on the primary server 310A.

In the overflow processing implemented by redirect filter 312A, there can be two main aspects to the overflow scaling process. In one aspect, the filter is configured to detect a condition to prepare for an overflow of the primary server, and to initiate or start the overflow server 310B. The other primary aspect is the filter processing used to overflow the user's request to the overflow server.

In one implementation, the system can be a z/OS system. The resource limits defined by the z/OS for a given task can be predetermined and considered when determining an applicable threshold. For instance, the thread count and/or heap memory can be used as resource constraint parameters for how many user requests, or more particularly, how may user sessions, can be accommodated on a server, such as on primary server, 310A in this example. Grouping users can be advantageous in the redirect process for processes or applications that use substantial or persistent threads per user session. In comparison, a load balancer balances requests by spreading requests of all users to all servers. This can result in spreading unnecessary usage of persistent threads required for each user session across multiple user instances. Advantageously, redirecting groups of users per server as described herein is an optimal approach to indirectly distributing thread usage among processes of the servers, as needed.

In one implementation, current thread counts and/or heap memory usage can be obtained using, for instance, the system's library functionality. Note that this approach need not be 100% accurate in terms of the servers' current usage, but an approximation is sufficient for measurements, with some acceptable margin of error. The number of users on a given server can also be tracked by the server itself.

As noted, for a REST service, the overflow processing consideration can be implemented at the servlet filter of the server, which is referred to herein as the redirect filter. When a request comes in, the server determines the current resource usage and produces a recommendation for connection handling, to either accommodate the request for the new user session on the primary server, or determine that there is a pre-overflow condition, an overflow condition, or a hard stop condition. In the accommodate condition, resource usage is, for instance, below the predetermined capacity threshold, and the server can handle the request itself. When resource usage is relatively high, for instance, within 20-30% of the predetermined capacity threshold, the server can enter the pre-overflow condition, where it prepares the overflow server (i.e., starts the overflow server if not already running), and continues handling the user request. When the server's resources (such as number of users, thread count, and/or heap memory usage) are consumed at or above the predetermined capacity threshold (e.g., 80%), the server redirects the user's request to the overflow server, such as described herein. Without an overflow server, and if server resources are used to over the limit, the server is considered in the hard stop state. In this case, the server denies the service request to avoid a crash. Note in this regard that a primary server can check on the active status of its overflow server by sending a REST request that does not require a dedicated connection. To minimize the time in checking status, the status of the overflow can be cached, along with a user overflow port map 317A identifying which users are mapped to which overflow ports. Note that an expired timer can be used to raise the need to perform a status check on an overflow server. For a REST service implementation with overflow scaling as disclosed herein, the implementation can use various types of processing, for instance, for ascertaining overflow status. For a GET method, in one embodiment, it can use http redirect with 'location' header pointing to the new overflow sensor, and an appropriate response return code for redirect (for example: 307 temporary_redirect). For other methods, in one embodiment, a JAVA URLConnection class can be used. For the URLConnection, the primary server will create a URLConnection, with content copied from the original request. It then waits on the overflow's response in return, copies a result to the original response, and returns the response to the user. These actions can be dedicated within a dedicated servlet thread, and do not delay the processing of new incoming requests.

Note that in the embodiment of FIG. 3, an overflow chain has server 310A as the primary server, which communicates directly with the client and is never automatically shut down. Server 310B is an overflow server for the primary server 310A, and it starts the overflow server 310C once it is at or exceeds its predetermined capacity threshold(s), as described herein. Similarly, server 310C can start its own overflow server 310D. In one or more implementations, each server can be an instances of the same underlying application server as the primary server 310A, and be provided with request handling and overflow scaling capability, as described herein. Note that each server's user overflow port map can vary and can contain a mapping of users accommodated by that server, as well as any overflow server, in a downward chain from that server. In this manner, users that would be handled by, for instance, server 310A, would not appear in the user overflow port map of overflow server 310B, since they would already be handled before reaching server 310B.

Advantageously, in the servlet threaded environment of the server, the determination as to the connection recommendation level can be done concurrently by the threads of all incoming requests. To avoid overbooking of a resource, resource reservation can be used at the server level. In this case, every request coming in, when determined to be handled at the primary server itself, will have to reserve a slot in the session reservation in the redirect filter. That can happen before the session for the request is actually set up and is filtered. When the session is established, the reservation can be released since the session has been administered to the current existing sessions. As noted, the overflow scaling disclosed herein is self-contained. It does not require any dependency on additional services. A server can be a primary or an overflow itself, other than the original server which initiates the overflow chain. Further, the overflow scaling facility disclosed herein can be turned ON or OFF at each server with a restart process. The advantage of such an implementation is that whether working with a large load or a small load, the same mechanism can be used without significant changes to the configuration. The effect is the provision of an overflow scaling facility which automatically scales, depending on resource usage.

Figure 4:
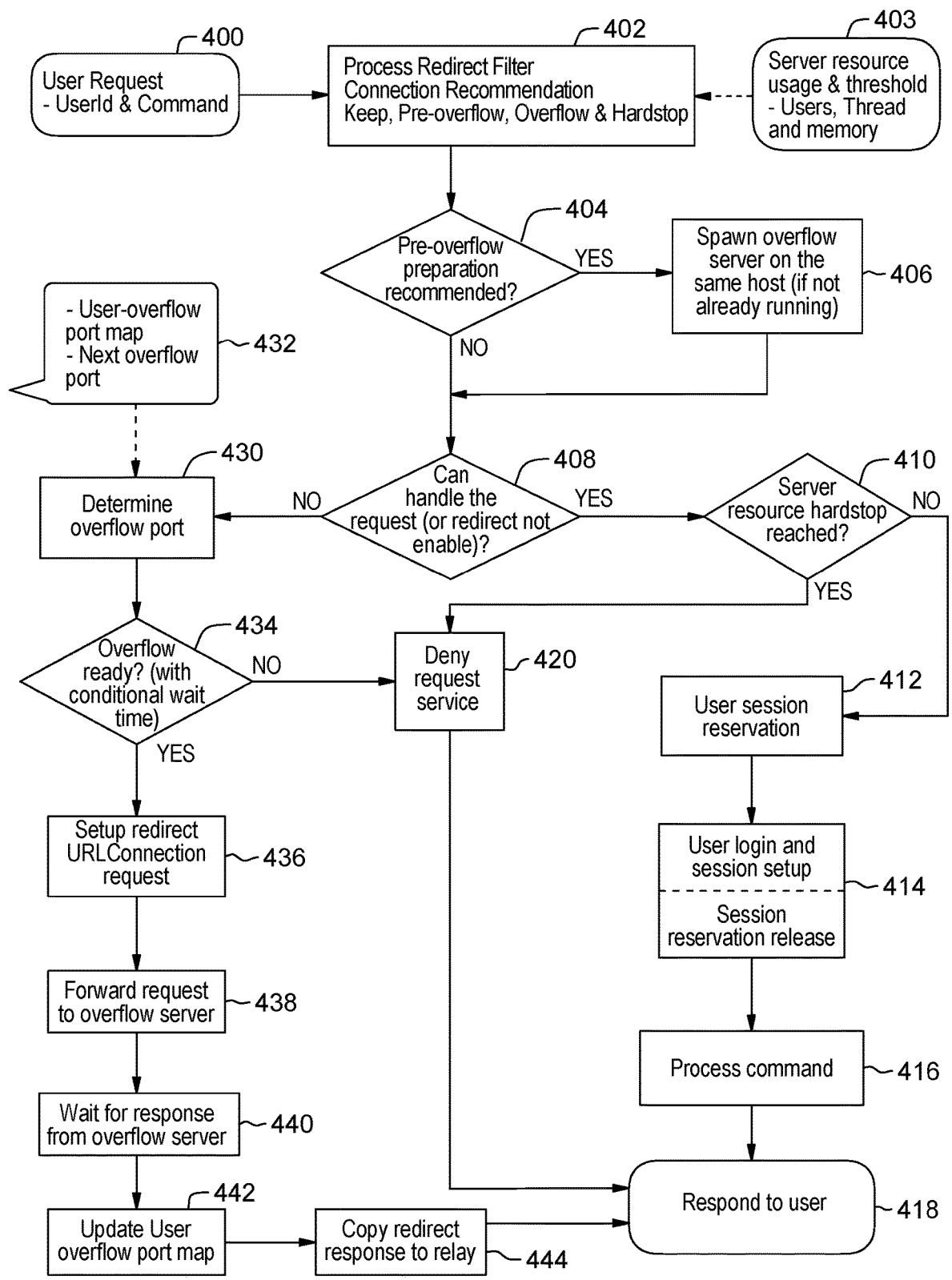
FIG. 4 depicts one embodiment of a workflow illustrating certain aspects of one or more embodiments of the present invention.

One embodiment of a workflow illustrating certain aspects of one or more embodiments of the present invention is depicted in FIG. 4. As illustrated, a user request 400 is received at a port of a process (e.g., server) of the multi-user computing environment. The request can include, in one embodiment, a user ID and a request command for processing. In accordance with one embodiment, the request is received at a process redirect filter of the server 402, which makes a session determination as to where to process the request. Where the request is a request for a new user session, the redirect filter determines whether accommodating the new user session on the server will result in resource usage of the server exceeding its predetermined capacity threshold(s) 403. Note in this regard that one or more capacity thresholds can be considered, such as for a number of users which can be accommodated, a number of threads available for processing user requests, and/or available memory. The redirect filter determines whether the request results in a keep condition, where the server is to process the request, a pre-overflow condition, where the server initiates or starts an overflow server, an overflow condition, where the request is to be forwarded to the overflow server, or a hard stop condition where the request is to be denied.

As illustrated, the redirect filter determines whether a pre-overflow condition is present, such that overflow preparation is recommended 404. If so, then the primary server spawns the overflow server on the same host (in one embodiment). If the overflow server is already running, then the primary server confirms that the overflow server is running. Assuming that the redirect filter does not determine overflow preparation is recommended 404, then processing determines whether the request can be handled on the primary server (or that redirect is not enabled) 408. Assuming "yes", then the primary server determines whether a resource hard stop has been reached 410. If "no", then a user session reservation 412 is made, and user login and/or setup occurs 414, resulting in release of the session reservation. The request command is processed by the primary server 416, and a response is sent to the user 418. Where the server has reached a resource hard stop, the primary server denies the request for service 420, and sends an appropriate response to the user 418.

If the primary server is unable to handle the request 408, then the primary server determines the overflow port to which the request can be sent 430. In one embodiment, the primary server can reference the user overflow port map cached at the primary server 432 to identify the port server to send the request. Where the user request is a request for a new user session, then the primary server is to forward the request to the overflow server. If the target overflow server is an overflow server further down the chain, the primary will set up a redirect URLConnection to forward to the overflow server. If the target overflow server is the direct overflow server, the primary server determines whether the overflow server is ready 434, which can involve a conditional wait time where the primary server has just started the overflow server. If the overflow server is a direct overflow and not ready, then the request for service is denied 420 and a response to the user's request is sent 418. Assuming that the overflow server is ready, then the primary server sets up (for instance, in one embodiment) a redirect URLConnection request 436 and forwards the request to the overflow server 438. The primary server waits for a response from the overflow server 440, and upon receiving the response, updates the user overflow port map 442. A copy of the redirected response 444 is made to relay the response to the user 418.

Figure 5:
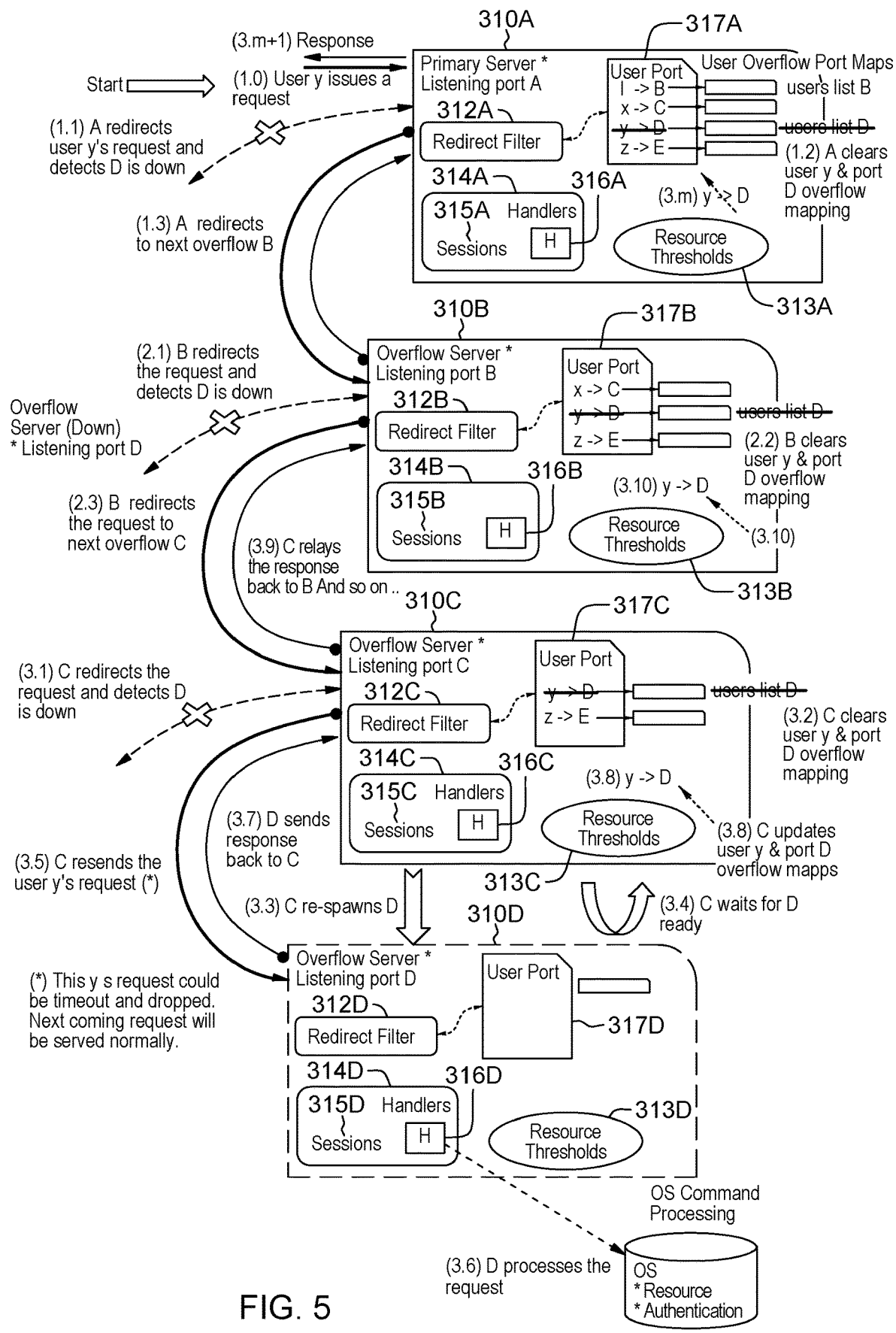
FIG. 5 depicts another example of a multi-user computing environment with application server scaling, in accordance with one or more aspects of the present invention.
Figure 6:
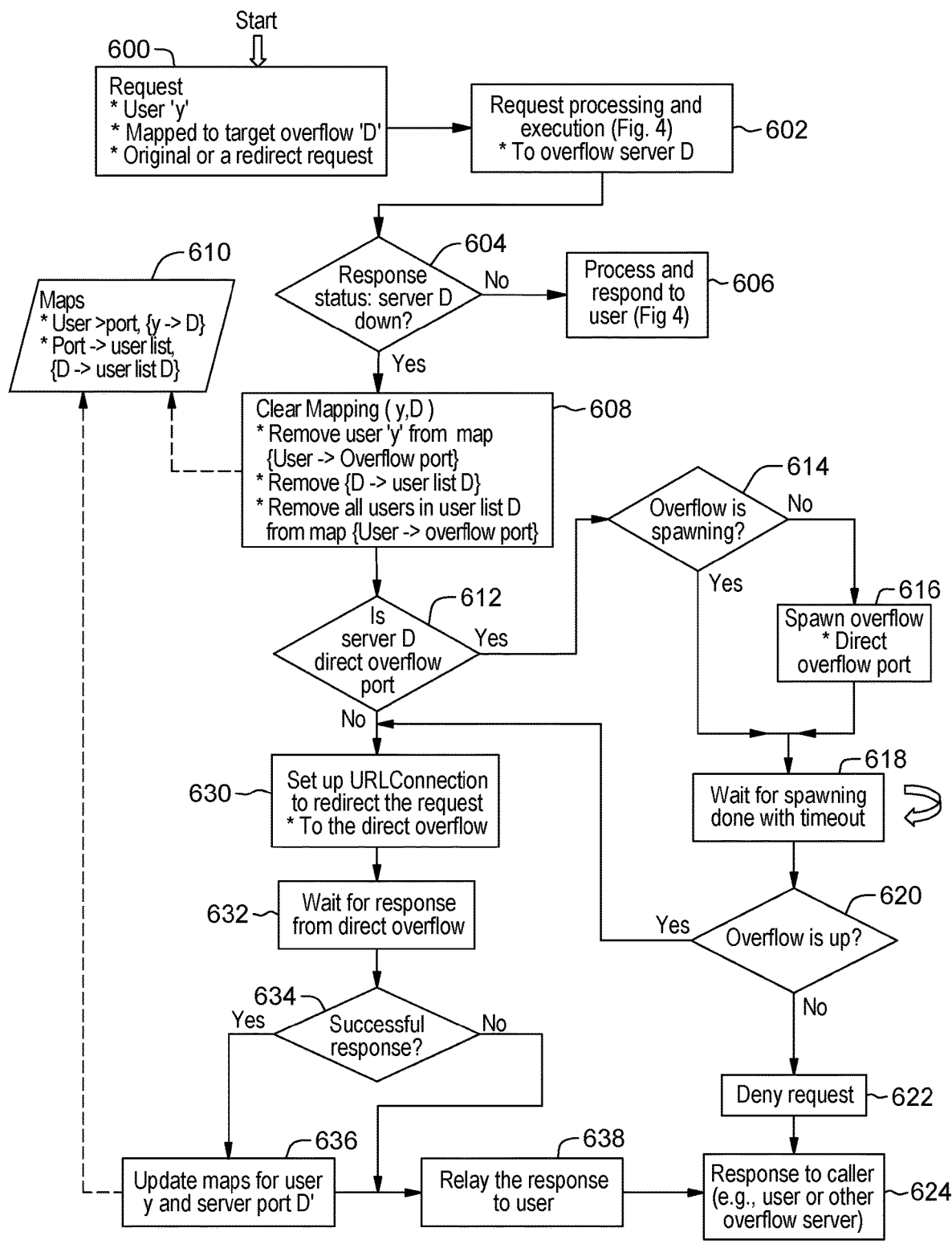
FIG. 6 depicts another embodiment of a workflow illustrating certain aspects of one or more embodiments of the present invention.

FIG. 5 depicts another example of processing within a multi-user computing environment with application server scaling such as depicted in FIG. 3, in accordance with one or more aspects of the present invention. In particular, processing is illustrated where an overflow server, such as overflow server 310D, has gone down or been decommissioned (for one reason or another). FIG. 6 illustrates an example workflow in the case where a user y was previously assigned to overflow server 310D, which as noted, has gone down. As illustrated in FIGS. 5 & 6, user y issues a request, and has been previously mapped to overflow server D. Depending on the server, the request can be an original request from user y or a redirected request from an upstream server. The redirect filter at the server receiving the request does request processing and execution, as described above in connection with FIG. 4, to determine that user y is registered to overflow server D 602. The receiving server determines the response status for server D to see if server D is down 604. Assuming that the server is available, then the request is processed and responded as described above in connection with FIG. 4. For instance, the server receiving the user y request can forward the request directly to overflow server D using the user port map cached at the server. Assuming, however, that overflow server D is down 604, then the receiving server clears the relevant information from the user overflow port map cached at the server 608. For instance, user y can be removed from the user overflow port map at the receiving server, and port D overflow mapping can be cleared. All users in user list D can be cleared from the map, resulting in an updated user overflow port map 610, such as illustrated in FIG. 5, where port D has been removed from the overflow port map for primary server 310A. Note in this regard that the same process of FIG. 6 can be repeated at each overflow sever, where overflow server D is unavailable to the primary server 310A, such that each user overflow port map is updated, again as illustrated in FIG. 5.

Along with updating the overflow port map, processing determines whether overflow server D is a direct overflow port to the server processing user y's request 612. If "yes", then processing determines whether a new overflow server instance is currently spawning 614, and if not, processing spawns the new direct overflow server 616. The server waits for the spawning to be completed using an appropriate timeout 618. Processing determines whether the overflow server is running 620 and if not, denies user y's request 622, and sends a response to the user 624. Assuming that the overflow server is running, or where server D is not the direct overflow server to the server processing user y's request, then processing sets up a redirect request URLConnection (in one embodiment) to redirect the request to the direct overflow server 630. The server then waits for a response to the redirected request from the overflow server 632 and determines whether the response was successful 634. If the response is unsuccessful, then the response is forwarded to user y 638. Assuming that the response is successful, then the server updates the overflow port map for user y and server port D 636, and relays the response to the user 638 and an appropriate response to the caller 624. Note in this regard, that the caller can be the user or another server up the chain.

Further details of one embodiment of facilitating processing within a multi-user computing environment, as it relates to one or more aspects of the present invention, are described with reference to FIGS. 7A-7C.

Referring to FIG. 7A, in one embodiment, a request for a new user session is received at a port of a process of the multi-user computing environment, where the process supports multiple users through the port 700. The process determines that accommodating the new user session will result in resource usage of the process exceeding a predetermined capacity threshold for the request 702, and based on the determining, redirects the request for the new user session to an overflow process started by the process 704. The overflow process is an additional instance of the process running within the multi-user computing environment. The process receives a response from the overflow process to the request for the new user session 706 and forwards the received response to the request for the new user session to the user 708.

In one or more embodiments, the process is an application server, and the overflow process is an overflow application server. Further, the method can include starting, by the application server, the overflow application server as another instance of the application server, where the starting is based on resource usage at the application server, and the resource usage includes one or more of a number of users using the application server, a number of threads being used by the application server, or an amount of memory being used by the application server 710.

Referring to FIG. 7B, in one embodiment, the determining and the redirecting occur at a redirect filter of the process, absent setup of the new user session at the process 712.

In certain implementations, the process includes an overflow port map data structure identifying a chain of one or more overflow processes associated with the process, and the process updates the overflow port map data structure based on receipt of the response from the overflow process to the request to indicate that the user session is mapped to the overflow process, where the overflow port map data structure facilitates redirecting one or more other requests to an appropriate overflow process of the one or more overflow processes in the chain 714. In one embodiment, the redirecting, by the process the request for the new user session to the appropriate overflow process, and the receiving, by the process, the response from the appropriate overflow process to the request for the new user session occurs transparent to the user 716.

In one or more implementations, the request is a new request, and the method further includes receiving, from another user, a prior request for a user session at the port of the process of the multi-user computing environment, where the prior request is prior to the new request 720, and determining by the process, that accommodating the user session of the prior request at the process will result in a pre-overflow condition relative to the predetermined capacity threshold 722. Based on determining existence of the pre-overflow condition, the method includes preparing for an overflow of the process by starting the overflow process, while accommodating the user session of the prior request at the process 724.

Referring to FIG. 7C, in one embodiment, the request is a new request 726, and the method further includes receiving, from another user, another request for a user session at the port of the process of the multi-user computing environment 728, and determining, by the process, that accommodating the user session of the other request will result in resource usage at the process remaining below the predetermined capacity threshold 730. Based on determining that accommodating the user session of the other request will result in resource usage at the process remaining below the predetermined capacity threshold, the other request is accommodated at the process 732.

In one embodiment, the method further includes determining, by the overflow process, that accommodating the new user session will result in resource usage at the overflow process exceeding a predetermined capacity threshold for the overflow process, and based thereon, redirecting, by the overflow process, the request for the new user session to another overflow process started by the overflow process, where the other overflow process is another instance of the process running within the multi-user computing environment 734.

In one or more implementations, the method further includes detecting, prior to the redirecting, that the overflow process is down, and based thereon, restarting, by the process, the overflow process as a new instance of the process running within the multi-user computing environment 736.

As one particular implementation, a computer-implemented process is provided for scaling an application server in a computing environment. The computer-implemented process includes: in response to receiving, by a server, a request for a service using a representational state transfer interface, generating a recommendation using resource usage computed by the server for connection handling as one of a set of recommendations including a keep condition, a pre-overflow condition, and overflow condition, and a hard stop condition; in response to determining that there is a keep condition, identifying that the resource usage, including a number of users, a thread count and heap memory usage, is below a predetermined threshold by, for instance, a first predetermined tolerance, enabling the request to be handled by the server itself; in response to identifying the pre-overflow condition, identifying that the resource usage is below the predetermined threshold by a second predetermined tolerance, and preparing for an overflow of the server, including starting an overflow server when not already running, to continue handling the request; in response to a determination of an overflow condition, identifying the resource usage as being above the predetermined threshold, and based thereon, redirecting the request to the overflow server, including groups of users per server, to indirectly distribute thread usage among processes of one or more overflow servers; and in response to determining that there is a hard stop condition, identifying the resource usage as being above the predetermined threshold, without an overflow server, and denying the request for service by the server.

Figure 8A:
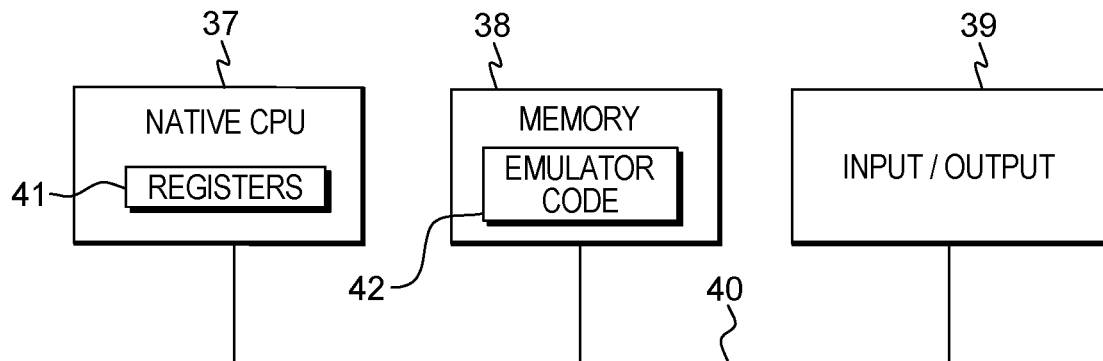
FIG. 8A depicts another example of a computing environment to incorporate and use one or more aspects of the present invention.

Another embodiment of a computing environment to incorporate and use one or more aspects of the present invention is described with reference to FIG. 8A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, N.Y.; an HP Superdome with Intel® Itanium® II processors offered by Hewlett Packard Co., Palo Alto, Calif.; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Itanium is a trademark or registered trademark of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 8B:
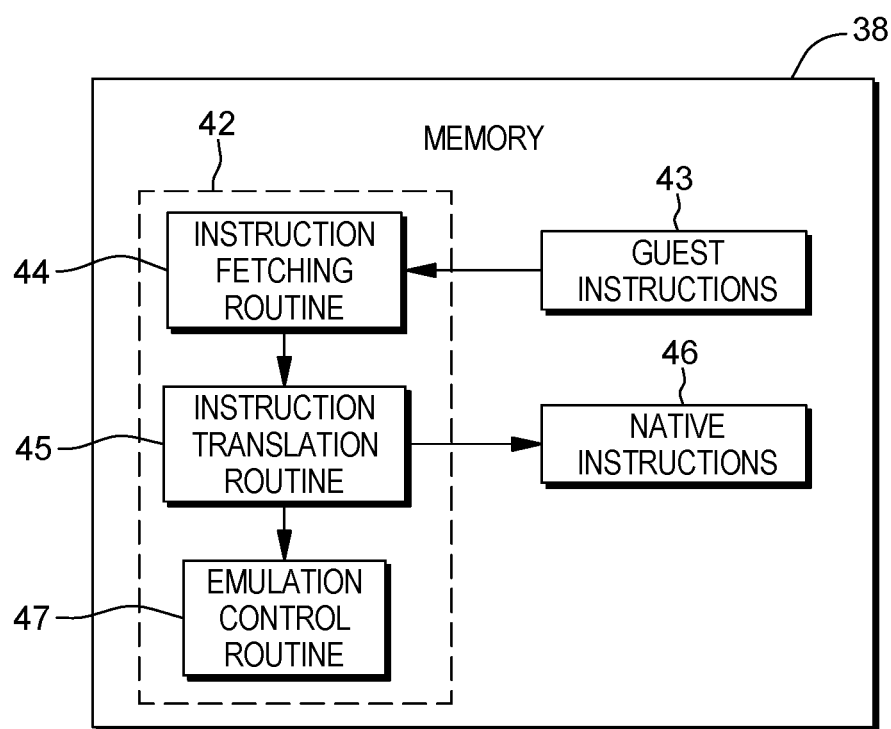
FIG. 8B depicts further details of the memory of FIG. 8A, in accordance with one or more aspects of the present invention.

Further details relating to emulator code 42 are described with reference to FIG. 8B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture hardware architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

One instruction that may be emulated is the Reset Dynamic Address Translation Protection instruction described herein, in accordance with an aspect of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
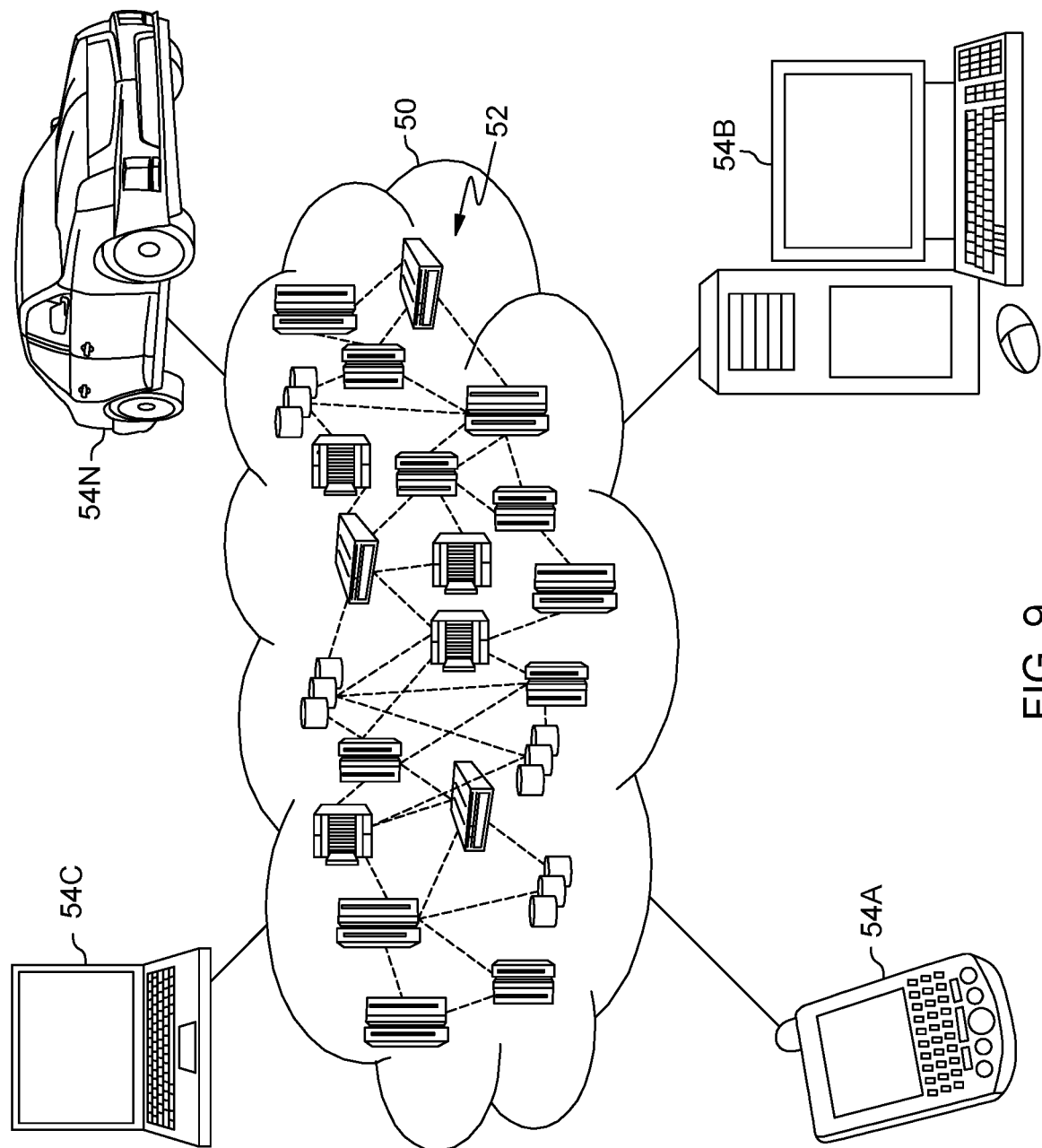
FIG. 9 depicts one embodiment of a cloud computing environment, in accordance with one or more aspects of the present invention.

Referring now to FIG. 9, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 52 and cloud computing environment 50 can communicate with any type of computerized device over any type of network and/or network addressable connection (e.g., using a web browser).

Figure 10:
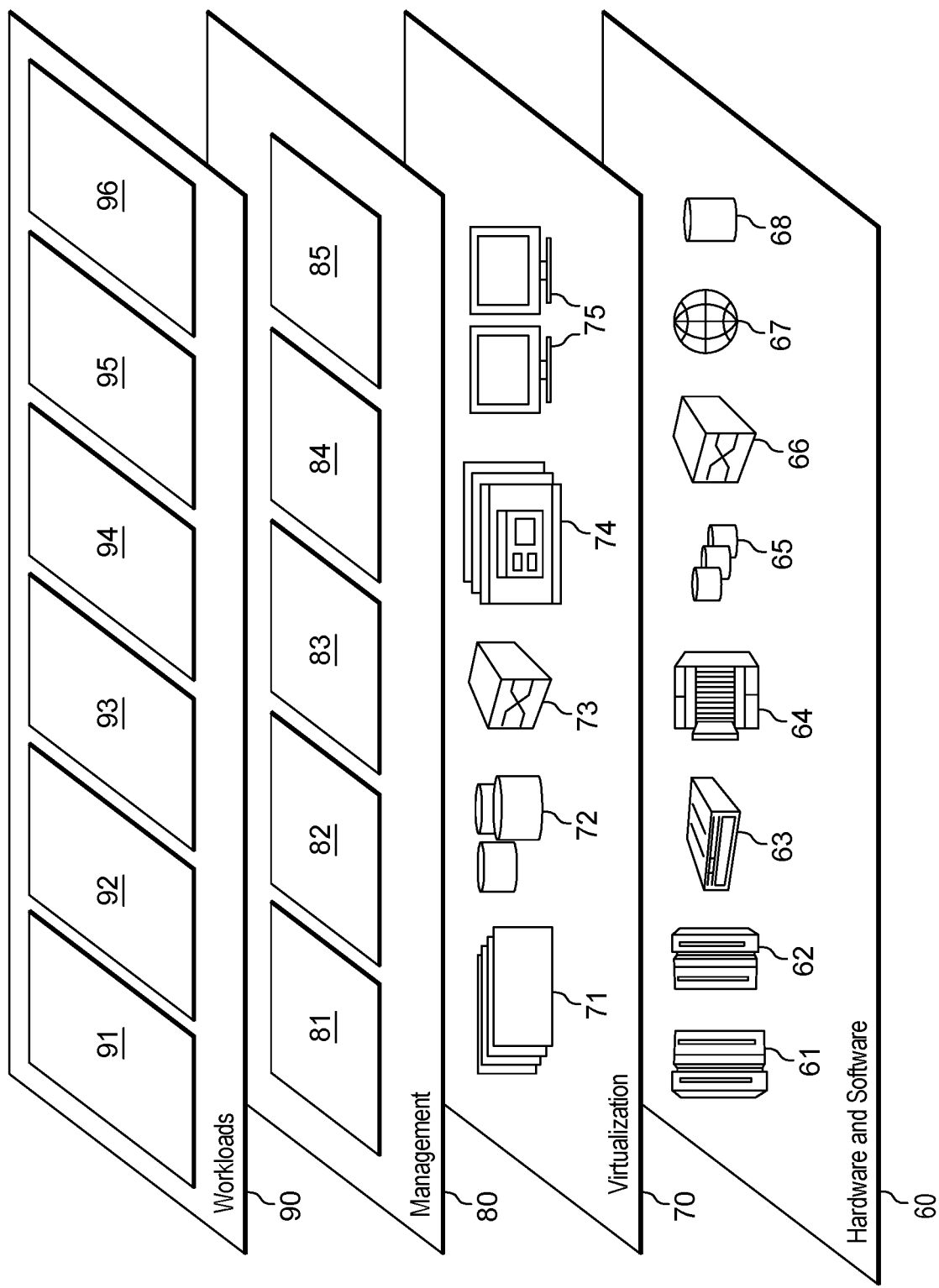
FIG. 10 depicts one example of abstraction model layers, in accordance with one or more aspects of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and request handling and dynamic overflow processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions or operations may be used. Additionally, different types of registers and/or different register may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a multi-user computing environment, the computer program product comprising:
   at least one computer-readable storage medium having program instructions embodied therewith, the program instructions being readable by a processing circuit to cause the processing circuit to perform a method comprising:
      receiving, from a user, a request for a new user session at a port of a process of the multi-user computing environment, the process supporting multiple users through the port;
      determining, by the process, that accommodating the new user session will result in resource usage of the process exceeding a predetermined capacity threshold for the process;
      based on the determining, redirecting by the process the request for the new user session to an overflow process started by the process, the overflow process being an additional instance of the process running within the multi-user computing environment;
      receiving, by the process, a response from the overflow process to the request for the new user session;
      forwarding, by the process, the received response to the request for the new user session to the user;
      wherein the determining and the redirecting occur at a redirect filter of the process; and
      wherein the process comprises an overflow port map data structure identifying a chain of one or more overflow processes associated with the process, and wherein the process updates the overflow port map data structure based on receipt of the response from the overflow process to the request to indicate that the user's session is mapped to the overflow process, the overflow port map data structure facilitating redirecting one or more other requests to an appropriate overflow process of the one or more overflow processes in the chain.

2. The computer program product of claim 1, wherein the process is an application server, and the overflow process is an overflow application server, and the method further comprises starting, by the application server, the overflow application server as another instance of the application server, the starting being based on resource usage at the application server, and the resource usage comprising one or more of a number of users using the application server, a number of threads being used by the application server, or an amount of memory being used by the application server.

3. The computer program product of claim 1, wherein the redirecting, by the process, the request for the new user session to the appropriate overflow process, and the receiving, by the process, the response from the appropriate overflow process to the request for the new user session occur transparent to the user.

4. The computer program product of claim 1, wherein the request is a new request, and the method further comprises:
   receiving, from another user, a prior request for a user session at the port of the process of the multi-user computing environment, the prior request being prior to the new request;
   determining by the process, that accommodating the user session of the prior request at the process will result in a pre-overflow condition relative to the predetermined capacity threshold; and
   based on determining existence of the pre-overflow condition, preparing for an overflow of the process by starting the overflow process, while accommodating the user session of the prior request at the process.

5. The computer program product of claim 1, wherein the request is a new request, and the method further comprises:
   receiving, from another user, another request for a user session at the port of the process of the multi-user computing environment;
   determining, by the process, that accommodating the user session of the other request will result in resource usage at the process remaining below the predetermined capacity threshold; and
   based on determining that accommodating the user session of the other request will result in resource usage at the process remaining below the predetermined capacity threshold, accommodating the other request for the user session at the process.

6. The computer program product of claim 1, further comprising:
   determining, by the overflow process, that accommodating the new user session will result in resource usage at the overflow process exceeding a predetermined capacity threshold for the overflow process, and based thereon, redirecting, by the overflow process, the request for the new user session to another overflow process started by the overflow process, the other overflow process being another instance of the process running within the multi-user computing environment.

7. The computer program product of claim 1, further comprising detecting, prior to the redirecting, that the overflow process is down, and based thereon, restarting, by the process, the overflow process as a new instance of the process running within the multi-user computing environment.

8. A computer system for facilitating processing within a computing environment, the computer system comprising:
   a memory; and
   a processing circuit in communication with the memory, wherein the computer system is configured to perform a method, the method comprising:

receiving, from a user, a request for a new user session at a port of a process of the multi-user computing environment, the process supporting multiple users through the port;

determining, by the process, that accommodating the new user session will result in resource usage of the process exceeding a predetermined capacity threshold for the process;

based on the determining, redirecting by the process the request for the new user session to an overflow process started by the process, the overflow process being an additional instance of the process running within the multi-user computing environment;

receiving, by the process, a response from the overflow process to the request for the new user session;

forwarding, by the process, the received response to the request for the new user session to the user;

wherein the determining and the redirecting occur at a redirect filter of the process; and wherein the process comprises an overflow port map data structure identifying a chain of one or more overflow processes associated with the process, and wherein the process updates the overflow port map data structure based on receipt of the response from the overflow process to the request to indicate that the user's session is mapped to the overflow process, the overflow port map data structure facilitating redirecting one or more other requests to an appropriate overflow process of the one or more overflow processes in the chain.

9. The computer system of claim 8, wherein the process is an application server, and the overflow process is an overflow application server, and the method further comprises starting, by the application server, the overflow application server as another instance of the application server, the starting being based on resource usage at the application server, and the resource usage comprising one or more of a number of users using the application server, a number of threads being used by the application server, or an amount of memory being used by the application server.

10. The computer system of claim 8, wherein the request is a new request, and the method further comprises:

receiving, from another user, a prior request for a user session at the port of the process of the multi-user computing environment, the prior request being prior to the new request;

determining by the process, that accommodating the user session of the prior request at the process will result in a pre-overflow condition relative to the predetermined capacity threshold; and based on determining existence of the pre-overflow condition, preparing for an overflow of the process by starting the overflow process, while accommodating the user session of the prior request at the process.

11. The computer system of claim 8, further comprising:

determining, by the overflow process, that accommodating the new user session will result in resource usage at the overflow process exceeding a predetermined capacity threshold for the overflow process, and based thereon, redirecting, by the overflow process, the request for the new user session to another overflow process started by the overflow process, the other overflow process being another instance of the process running within the multi-user computing environment.

12. The computer system of claim 8, further comprising detecting, prior to the redirecting, that the overflow process is down, and based thereon, restarting, by the process, the overflow process as a new instance of the process running within the multi-user computing environment.

13. A computer-implemented method of facilitating processing within a computing environment, the computer-implemented method comprising:

receiving, from a user, a request for a new user session at a port of a process of the multi-user computing environment, the process supporting multiple users through the port;

determining, by the process, that accommodating the new user session will result in resource usage of the process exceeding a predetermined capacity threshold for the process;

based on the determining, redirecting by the process the request for the new user session to an overflow process started by the process, the overflow process being an additional instance of the process running within the multi-user computing environment;

receiving, by the process, a response from the overflow process to the request for the new user session;

forwarding, by the process, the received response to the request for the new user session to the user;

wherein the determining and the redirecting occur at a redirect filter of the process; and wherein the process comprises an overflow port map data structure identifying a chain of one or more overflow processes associated with the process, and the process updates the overflow port map data structure based on receipt of the response from the overflow process to the request to indicate that the user session is mapped to the overflow process, the overflow port map data structure facilitating redirecting one or more other requests to an appropriate overflow process of the one or more overflow processes in the chain.

14. The computer-implemented method of claim 13, wherein the process is an application server, and the overflow process is an overflow application server, and the method further comprises starting, by the application server, the overflow application server as another instance of the application server, the starting being based on resource usage at the application server, and the resource usage comprising one or more of a number of users using the application server, a number of threads being used by the application server, or an amount of memory being used by the application server.

* * * * *